Dec. 24, 1935.  C. D. BRADY  2,025,678
LOAD RETAINING ATTACHMENT FOR SHOVEL BLADES
Filed Oct. 5, 1934
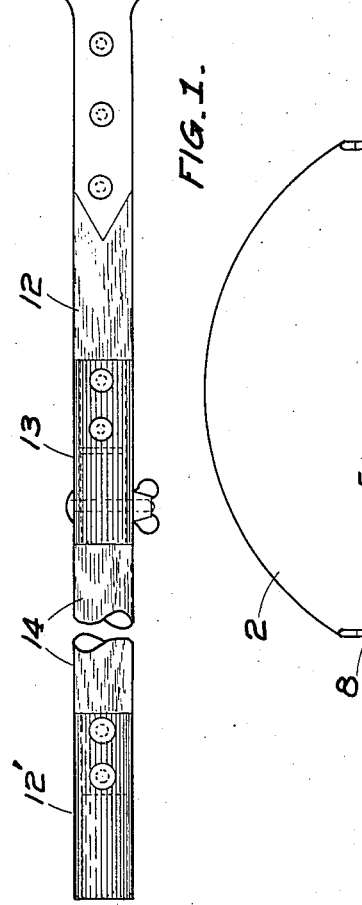
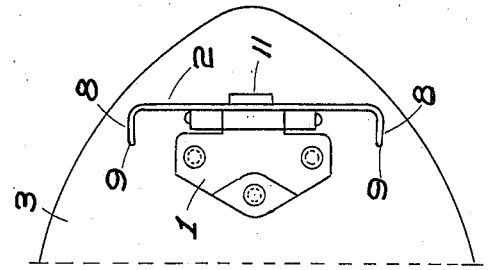
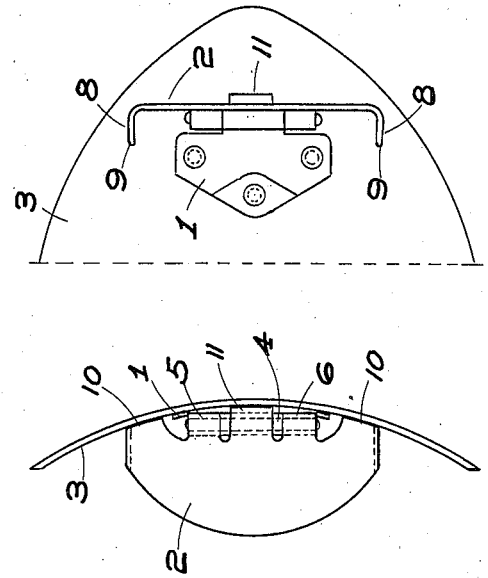
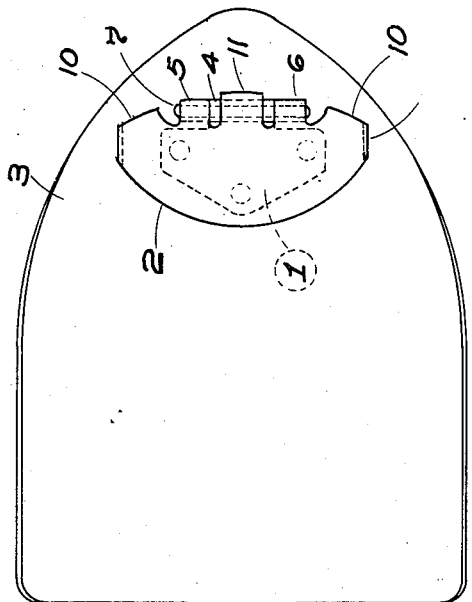
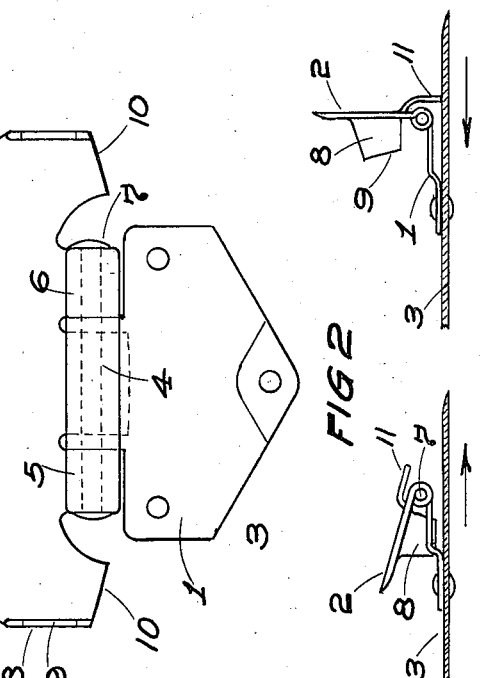
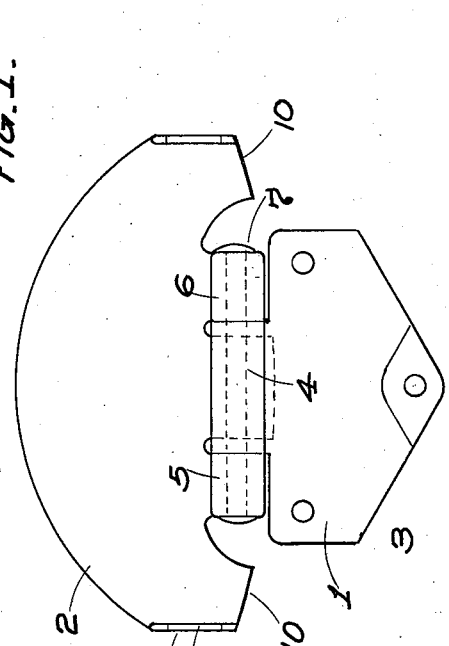
INVENTOR
Cleo D. Brady
BY
Edward R. Inman
ATTORNEY Patented Dec. 24, 1935

2,025,678

UNITED STATES PATENT OFFICE 2,025,678

LOAD-RETAINING ATTACHMENT FOR SHOVEL BLADES

Cleo D. Brady, Pleasantville, Pa., assignor to himself and Henry D. Hoblitzell, West Hickory, Pa.

Application October 5, 1934, Serial No. 747,005

1 Claim. (Cl. 294—49)

This invention relates to an improved attachment for shovel blades and is shown in the drawing which forms a part hereof, as being attached to the blade of a shovel of the type known as an irrigating shovel.

The object of this invention is, to equip blades of shovels for use in culverts, sewers and like structures, whereby they are adapted to remove débris from such structures, by longitudinal operation therein. In such use, this attachment is secured by means of a hinge member to the upper face of the shovel blade, adjacent to the point or forward edge thereof so that a member of said attachment termed the load-retainer may be rearwardly manipulated into a position which is in close juxtaposition to and substantially parallel to said face, whereby the shovel is adapted for insertion into or beneath the débris within a sewer or culvert, and as the shovel is retracted, said load retainer is automatically actuated forwardly by the inertia or resistance of the gathered load into a position which is substantially perpendicular to said face, wherein it serves to retain the load upon the shovel.

The construction whereby I am enabled to attain said object is clearly illustrated in the drawing in which:

Fig. 1 is a face view of a shovel blade showing my improved attachment affixed thereto, in its load receiving position.

Fig. 2 is a view of my attachment with its members arranged in an aligned position, for better illustration, but said members are not adapted to occupy such relative position in actual use.

Fig. 3 is a longitudinal section through the adjacent portion of a shovel blade to which my attachment is affixed, and shows the load-retaining member in the position which it occupies for insertion into or beneath material being operated upon, as shown in Fig. 1, that is, when being thrust in the direction indicated by the adjacent arrow.

Fig. 4 is a longitudinal section through the adjacent portion of a shovel blade and shows the load retainer in the position into which it is automatically actuated by the retraction of the shovel in the direction indicated by the adjacent arrow, whereby the load is retained upon the blade.

Fig. 5 is a view as if looking into the blade of a shovel from its forward edge, with the attachment in the position shown in Fig. 4.

Fig. 6 is a plan view of the forward portion of a shovel blade with the load retainer in the position shown in Fig. 4.

The construction whereby the object set forth is attained, is clearly illustrated in the accompanying drawing. It consists of a hinge structure composed of a base-plate 1 and a material-retaining plate 2; said base-plate is secured in any suitable manner to the inside or upper face of the shovel blade 3, with its hinge feature 4 foremost and extending transversely of said blade.

Said material-retaining plate is provided with two hinge features 5, 6 adapted to form a hinge union with said feature 4, said features being connected by means of a hinge-pin 7, so that said retaining plate may swing from a perpendicular position toward the rearward portion of the shovel blade, the limits of which vertically swinging movement are determined by means of positive stops, whereby said plate 2 may occupy the operative positions shown in Fig. 3, which is the loading position, or in Fig. 4 which is the load or material-retaining position. The loading position stops are indicated by the reference numerals 8, 8, the edges 9 of which contact with the inner face of blade 3 in the loading position; the material retaining stops, whereby the retaining plate is caused to be retained in its vertical position, shown in Figs. 4 and 5, are indicated by the numerals 10, 10 and 11; when said plate 2 is raised to the vertical position, these stops 10 and 11 contact with the inner face of the shovel blade, and in this way they limit the swinging movement of plate 2 substantially within the limits of a quadrant, as indicated in Figs. 3 and 4.

My improved shovel attachment operates in substantially the following manner:

When débris is to be removed from the open end of a sewer, culvert or like structure, the material retaining plate 2 is placed in the position shown in Fig. 3, wherein it is substantially parallel with the adjacent face of the shovel blade, but tending upwardly somewhat from the hinge point; the shovel blade is then thrust in the direction indicated by the arrow in said Fig. 3, into the débris, or beneath the same, to the full length of the blade; the blade is then withdrawn in the direction indicated by the arrow in Fig. 4, and this withdrawal causes the material-retaining plate to be actuated by the resistance of the load, into the load-retaining position shown in Fig. 4, the shovel with its load is then withdrawn from the open end of the culvert or sewer and freed from its load; this operation is repeated until the culvert is freed from the obstructions therein. As the work progresses, additional sections may be added to the handle to give it the required length, as indicated in Fig. 1, in which a permanent section 12 of the handle is shown as being supplied with a tubular sleeve 13 which forms a socket for the reception of the adjacent end of an extension 14, which in turn is supplied with a tubular socket 12' for the reception of another section; as many extension sections may be used as the length of the culvert or other structure being cleaned, may require.

My improved attachment may be readily attached to various forms of shovel blades, as well as the particular irrigation type illustrated in the drawing.

I claim the following:

In a load-retaining attachment for shovel blades, a hinge member adapted for attachment to the upper face of such blades at a point adjacent the forward edge and extending transversely of said blade, in combination with a load-retaining member provided with a hinge feature for engagement with said hinge member whereby said load-retaining member is adapted to have swinging movement and to be manipulated into a load-receiving position in which it extends rearwardly from said hinge member and is substantially parallel with and in juxtaposition with said blade, and to be actuated into its load-retaining position by the inertia of a gathered load as the shovel is being withdrawn from the material from which the load is being taken.

CLEO D. BRADY.